United States Patent
Cardi et al.

(10) Patent No.: US 10,359,135 B2
(45) Date of Patent: Jul. 23, 2019

(54) GASKET FOR QUICK COUPLERS AND QUICK COUPLER COMPRISING SAID GASKET

(71) Applicant: Faster S.P.A., Rivolta D'Adda (IT)

(72) Inventors: Massimo Cardi, Pandino (IT); Mauro Rambaldini, Cernusco sul Naviglio (IT); Giampiero Boffelli, Spino D'Adda (IT); Igor Polgati, Agnadello (IT); Paolo Rusconi, Rivolta D'Adda (IT)

(73) Assignee: Faster S.P.A., Rivolta D'Adda (IT)

( * ) Notice: Subject to any disclaimer, the term of this patent is extended or adjusted under 35 U.S.C. 154(b) by 0 days.

(21) Appl. No.: 15/188,782

(22) Filed: Jun. 21, 2016

(65) Prior Publication Data
US 2017/0023160 A1    Jan. 26, 2017

(30) Foreign Application Priority Data
Jul. 3, 2015  (EP) ..................... 15175297

(51) Int. Cl.
*F16L 21/02* (2006.01)
*F16J 15/10* (2006.01)
*F16L 37/23* (2006.01)
*F16L 55/07* (2006.01)

(52) U.S. Cl.
CPC ............. *F16L 21/02* (2013.01); *F16J 15/104* (2013.01); *F16L 37/23* (2013.01); *F16L 55/07* (2013.01)

(58) Field of Classification Search
CPC ........ F16J 15/32; F16J 15/3208; F16J 15/166; F16L 21/02
See application file for complete search history.

(56) References Cited

U.S. PATENT DOCUMENTS

| | | | | |
|---|---|---|---|---|
| 2,365,774 A | * | 12/1944 | Pool ....................... | F16J 15/182 277/584 |
| 3,214,182 A | * | 10/1965 | Herbruggen ............. | F16J 15/32 277/465 |
| 3,268,235 A | * | 8/1966 | Jacobellis ................ | F16J 15/32 277/468 |
| 3,271,038 A | * | 9/1966 | Bastow .................. | F16J 15/166 277/562 |
| 3,331,609 A | | 7/1967 | Moran | |
| 3,418,001 A | * | 12/1968 | Rentschler ............... | F16J 15/32 277/468 |
| 3,663,024 A | * | 5/1972 | Traub ....................... | F16J 15/32 277/582 |

(Continued)

FOREIGN PATENT DOCUMENTS

| | | |
|---|---|---|
| EP | 0277484 A2 | 8/1988 |
| EP | 1209384 A1 | 5/2002 |
| EP | 2431646 A1 | 3/2012 |

*Primary Examiner* — Kristina R Fulton
*Assistant Examiner* — L. Susmitha Koneru
(74) *Attorney, Agent, or Firm* — Stetina Brunda Garred & Brucker

(57) ABSTRACT

The present invention concerns a gasket for quick couplers, in particular for the fluid tightness of the first valve of a male coupler. It is characterised in that it must be a composite gasket, having a toroidal shape and circumferentially comprising an O-Ring at its outer surface.
The gasket according to the present invention allows a number of advantages to be achieved in terms of the stability and greater reliability of the gasket, which is not subject to extrusion and crushing phenomena during the coupling and decoupling steps of the pressurised coupler.

15 Claims, 4 Drawing Sheets

(56) References Cited

U.S. PATENT DOCUMENTS

| | | | | |
|---|---|---|---|---|
| 3,727,925 A * | 4/1973 | Jones | F16J 15/32 | |
| | | | 277/468 | |
| 4,013,299 A * | 3/1977 | Scott | F16J 15/3208 | |
| | | | 277/556 | |
| 4,030,730 A * | 6/1977 | Maguire | B62D 55/0887 | |
| | | | 277/380 | |
| 4,151,999 A * | 5/1979 | Ringel | F16J 15/32 | |
| | | | 277/589 | |
| 4,418,918 A * | 12/1983 | Nicoll | F16J 15/021 | |
| | | | 277/312 | |
| 4,566,703 A * | 1/1986 | Zitting | F16J 15/3208 | |
| | | | 277/436 | |
| 4,614,348 A * | 9/1986 | Fournier | F16J 15/166 | |
| | | | 277/625 | |
| 5,009,435 A * | 4/1991 | Villanyi | F16J 15/3232 | |
| | | | 277/552 | |
| 5,044,812 A * | 9/1991 | Ardelt | E02F 9/006 | |
| | | | 403/154 | |
| 5,092,610 A * | 3/1992 | Dunham | F16J 15/3212 | |
| | | | 277/589 | |
| 5,143,382 A * | 9/1992 | Maringer | F16J 15/164 | |
| | | | 277/584 | |
| 5,306,021 A * | 4/1994 | Morvant | F16J 15/3232 | |
| | | | 277/530 | |
| 5,374,168 A * | 12/1994 | Kozawa | F04B 5/02 | |
| | | | 277/467 | |
| 5,509,670 A * | 4/1996 | Wheeler | F16J 15/3272 | |
| | | | 277/565 | |
| 6,076,830 A * | 6/2000 | Wu | F16J 15/3488 | |
| | | | 277/387 | |
| 6,557,857 B1 * | 5/2003 | Goodman | F16J 15/3224 | |
| | | | 277/549 | |
| D598,988 S * | 8/2009 | Jaccoby | D23/269 | |
| D633,991 S * | 3/2011 | Nakagawa | D23/269 | |
| D646,764 S * | 10/2011 | Rusconi | D23/269 | |
| D655,401 S * | 3/2012 | Muramatsu | D23/269 | |
| D655,797 S * | 3/2012 | Muramatsu | D23/269 | |
| 8,672,418 B2 * | 3/2014 | Harada | B60T 8/4031 | |
| | | | 277/589 | |
| 2007/0210528 A1* | 9/2007 | Baber | F16J 15/104 | |
| | | | 277/549 | |
| 2009/0102141 A1* | 4/2009 | Wagner | F16J 15/062 | |
| | | | 277/650 | |
| 2010/0090412 A1* | 4/2010 | Scott | F04D 29/126 | |
| | | | 277/375 | |
| 2010/0244431 A1 | 9/2010 | Smith, III | | |

\* cited by examiner

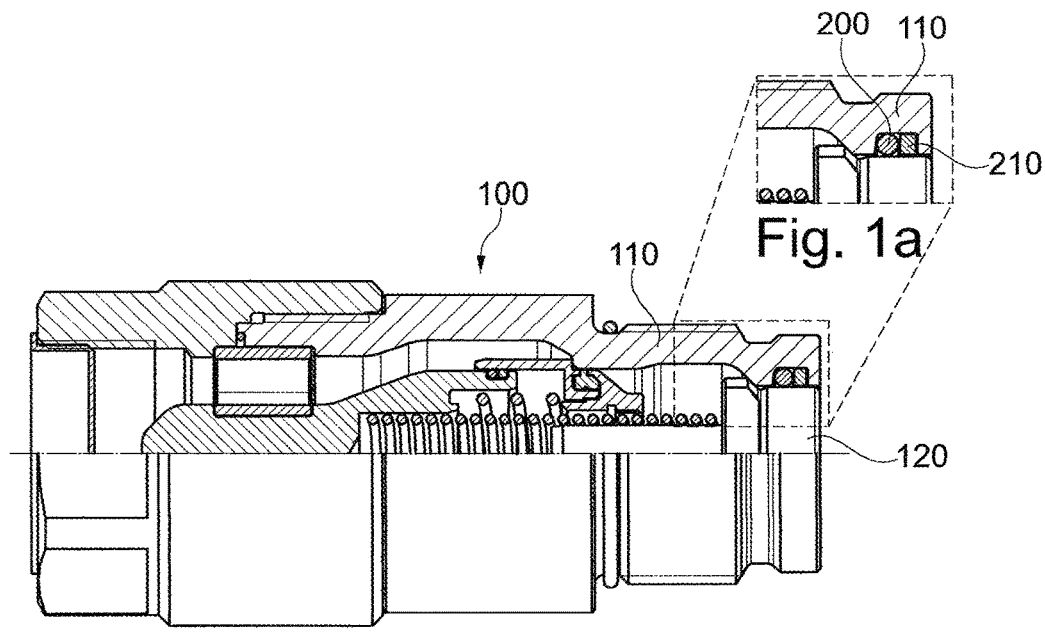
Fig. 1
Fig. 1a
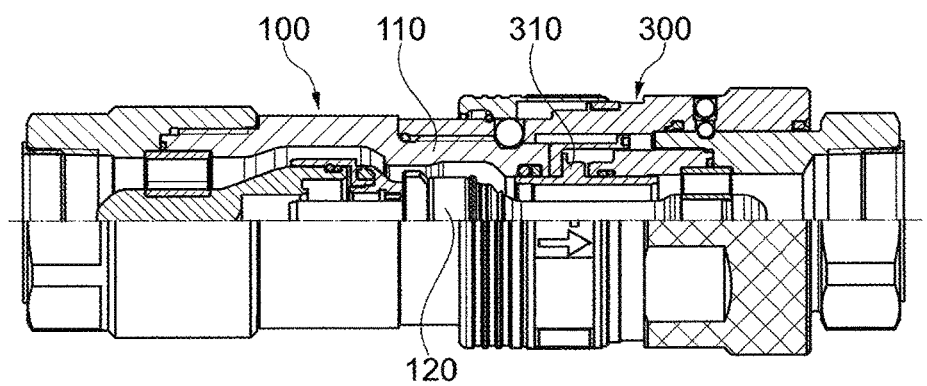
Fig. 1b

GASKET FOR QUICK COUPLERS AND QUICK COUPLER COMPRISING SAID GASKET

CROSS REFERENCE TO RELATED APPLICATIONS

The present application claims priority to European Patent Application No. 15175297.9 filed Jul. 3, 2015, the entirety of the disclosures of which are expressly incorporated herein by reference,

STATEMENT RE: FEDERALLY SPONSORED RESEARCH/DEVELOPMENT

Not Applicable.

FIELD OF THE INVENTION

The present invention relates to a gasket for quick couplers and to a quick coupler comprising this gasket.

More in particular, the present invention concerns a front valve gasket of a male quick coupler.

The present invention also further concerns a quick male coupler comprising this gasket.

STATE OF THE ART

In the prior art it is known to produce male quick couplers, which are intended to be coupled to a corresponding female quick coupler, equipped with a front valve, i.e. the shut-off valve of the axial channel of the coupler, which seal is guaranteed by the presence of a torodial gasket having a circular cross section, the classic O-Ring.

The situation is depicted in FIG. 1 and in the magnification of FIG. 1a while FIG. 1b shows the final connecting step of the male quick coupler 100 and the female quick coupler 300.

In a male coupler 100, the gasket 200 of a known type is placed between the hollow cylindrical outer body 110 and the valve body 120, and therefore ensures the fluid tightness of these two elements even when the valve body 120 slides longitudinally with respect to the outer body 110.

With particular reference to FIG. 2, in which a connecting step of the male coupler 100 into a female coupler 300 is represented, it is noted that during the connecting step and, in particular, in the case in which there is residual pressure in the chamber in which said valve body 120 is housed, the gasket 200 is subject to a stress that tends to deform it until there is a risk that it may be guillotined, i.e. pinched between the valve body 320 of the female coupler 300 and the inner slider 310 of the female coupler itself.

According to the state of the art, so as to avoid the risk of extrusion 210 of the gasket during gasket 200 operation, nevertheless, this expedient does not however prevent the problems of extrusion and crushing of the O-Ring, which deforms in the plastic field and loses all fluid tightness capacity.

Considering therefore the most onerous applications for quick couplers, such as, for example, the so-called heavy duty applications "heavy duty" in the earthmoving machinery sector, quick couplers require a considerable mechanical resistance which must also be combined with a perfect seal of the coupled coupler, in all possible use positions of use and in all possible pressure conditions.

There is therefore the problem of guaranteeing the seal, and thus the perfect operation of the above-identified gasket, while preventing crushing and extrusion of the gasket itself, The technical applications of the couplers that are being discussed therefore require that the gasket seal also be guaranteed under particularly onerous operating conditions.

Among other characteristics that must be obtained from the gasket, this characteristic must guarantee a perfect seal regardless of the spatial orientation (horizontal/vertical) of the coupler.

In addition, the gasket seal must also be guaranteed even in the presence of side load (bending phenomena) due to the weight of the pipe connected to the coupler, and in the presence of high pressure when the coupler is connected (typically meaning 350 bar and above) even in the presence of square-wave pulses.

Again, a perfect seal must also be guaranteed in the presence of a vacuum when the coupler is connected (typically meaning about 755 mmHg).

Again, particularly onerous usage conditions must not cause overturning or extrusion of the gasket and this also applies, for example, in the presence of high flow rates and/or square-wave pressure pulses, thanks to the particular shape of the gasket and of the corresponding seat.

Moreover, the gasket should be easily replaceable in the event of damage thereto, and must have a suitable flexible & deformable behaviour and abrasion and fatigue resistance properties.

The gaskets of the type known in the prior art are unable to guarantee the above-mentioned operating characteristic, primarily for the following reasons.

With respect to the "bending" phenomenon, i.e. the gasket sealing phenomenon, in the presence of side load due to the weight of the pipe connected to the coupler, the O-Ring gasket with anti-extrusion ring of a known type is unable to guarantee sealing, as the O-Ring is characterised by limited possibilities of recovering the compression deformation. When the coupler is subjected to side load, a part of the gasket is not subjected to compression and failure of the seal therefore occurs with consequent leakage of the working fluid.

Moreover, in the presence of fluid having high pressure when the coupler is connected (typically meaning 350 bar and above) the O-Ring gasket is primarily subject to a component of the radially-oriented outward thrust. This significantly limits gasket resistance under square-wave pulse pressure conditions.

Again, the O-Ring gaskets of a known type are not suitable for guaranteeing the seals in the presence of a vacuum when the coupler is connected.

In the same way, when gaskets of a known type are subjected to high flow rates and/or square-wave pressure pulses, extrusion and overturning phenomena of the gasket occur.

Again, the classic mixes used for O-Ring gaskets (Viton, Nitrile Rubber) do not always guarantee an adequate elastic return, tenacity and abrasion resistance.

SUMMARY OF THE INVENTION

The technical aim of the present invention is therefore to provide a gasket which allows the above-listed conditions of efficiency and safety to be achieved and guaranteed and that makes it possible to overcome the disadvantages that afflict the gaskets of a known type, allowing greater reliability and high performance to be achieved.

In the context of this aim, the object of the present invention is to provide a gasket that in particular resolves the problem of gasket extrusion, above all, but not only, in the critical transfer step of the male coupler valve 120 to the female coupler slider 310.

This aim and these and other objects that will become clearer below are achieved by a front valve gasket 1 of a male quick coupler, as claimed in the accompanying claims, which form an integral part of the present description.

LIST OF DRAWINGS

Further characteristics and advantages of the present invention shall become clearer from the following detailed description, provided by way of a non-limiting example and illustrated in the accompanying drawings, wherein:

FIG. 1 shows a partial cross-sectional side view with a vertical plane of a male coupler comprising a gasket of a type known in the prior art FIG. 1a shows a detail of FIG. 1, in which an enlarged view of the gasket of a known type and the anti-extrusion ring are shown;

FIG. 1b shows a male coupler fully coupled with a female coupler;

Figures 7, 8, 9A, 9B:
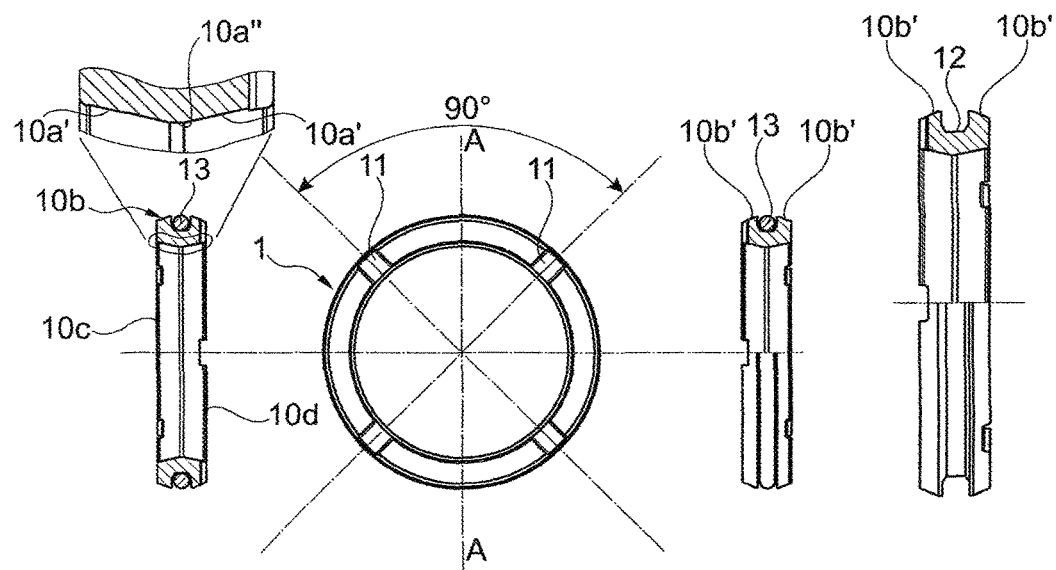
FIG. 7 shows a cross-sectional front view of the gasket according to the present invention according to the A-A plane of FIG. 8.
FIG. 8 shows a plan view of the gasket according to the present invention.

9a shows a partial cross-sectional front view of the gasket according to the present invention according to the A-A plane of FIG. 8;

FIG. 9b shows the same view as FIG. 9a wherein the O-Ring has been removed.

DETAILED DESCRIPTION OF THE INVENTION

The following description illustrates a preferred embodiment of the gasket according to the present invention. This description is provided by way of a non-limiting example, therefore any variant of what has been described that can be deemed equivalent must be considered as falling within the scope of the present invention.

With particular reference to FIG. 1, in a male coupler 100, the gasket 200 of a known type is placed in a seat specially provided on the outer body 110, which is a hollow cylindrical body, and the valve body 120, and therefore ensures the fluid-tightness of these two elements even when the valve body 120 slides longitudinally with respect to the outer body 110.

Figure 2:
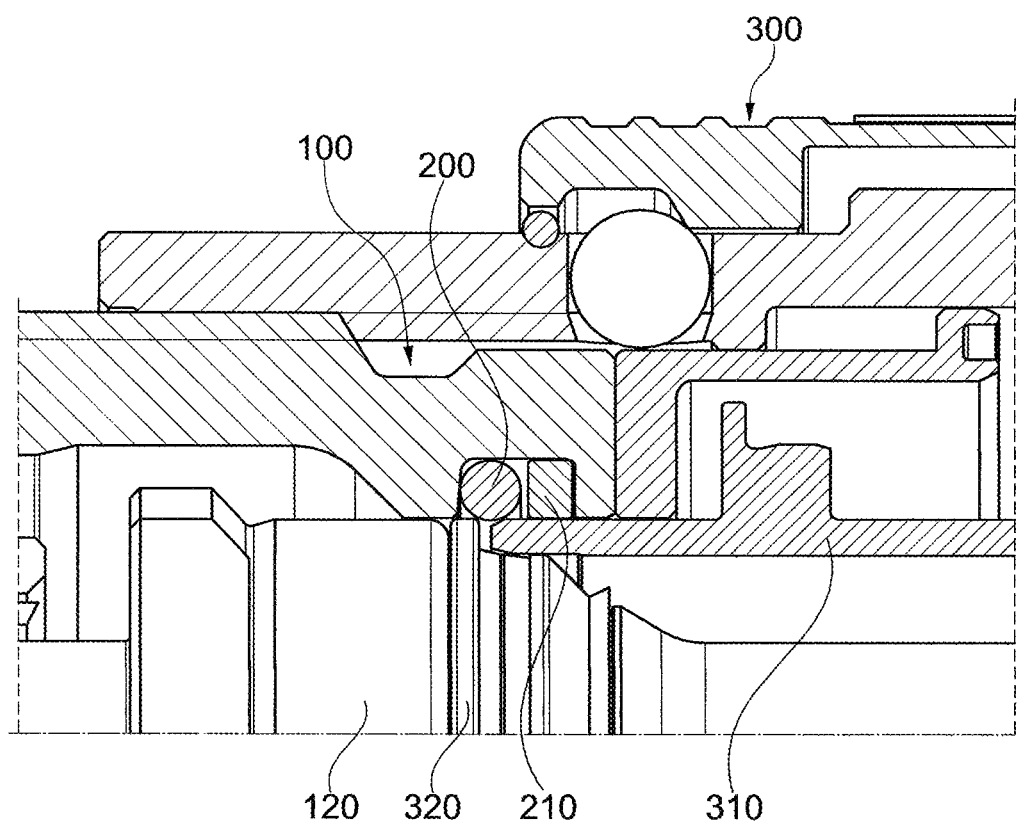
FIG. 2 shows a cross section of the critical transfer step of the seal from the male coupler valve to the female coupler slider, again in the case of a gasket of a type known in the prior art.

With particular reference to FIG. 2, which represents a connecting step of the male 100 into a female coupler 300, it is noted that during the connecting step, the seal is transferred from the valve body 120 of the male coupler 100 to the slider 310 of the female coupler 300.

This step is particularly critical in the case where there is residual pressure in the chamber in which said valve body 120 is housed.

The valve gasket is subject to a stress that tends to deform it until there is a risk of it being guillotined, i.e. pinched between the valve body 320 of the female coupler 300 and the inner slider 310 of the female coupler itself, as can be seen in FIG. 2.

Figures 3, 4:
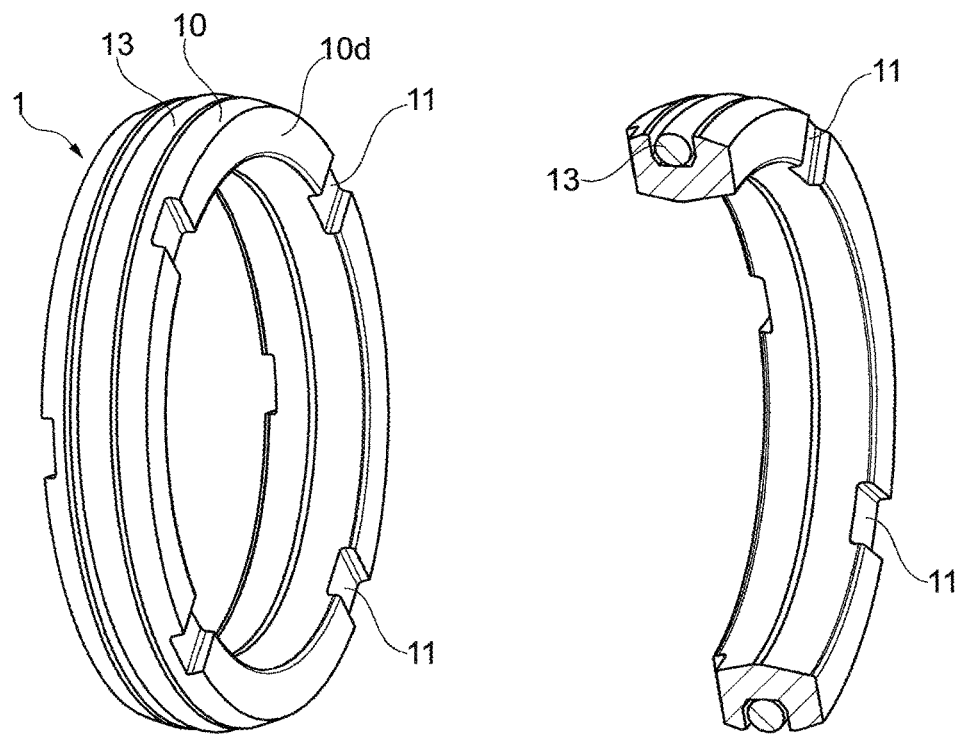
FIG. 3 shows a perspective view of the gasket according to the present invention.
FIG. 4 shows the same view as FIG. 3, sectionised with a vertical transverse plane.

With reference to FIG. 3, the object of the present invention is a gasket 1 having a substantially toroidal shape, comprising a main body 10 preferably made of Polyurethane (PUR) and preferably obtained by moulding process.

The main body 10 of the gasket 1 according to the present invention therefore has a toroidal shape, and therefore comprises an inner surface 10a of the toroid FIG. 7, an outer surface 10b of the toroid FIG. 7, a first side surface 10c and a second side surface 10d FIG. 7.

In the cross section on a transverse plane, the gasket of the present invention has a particular, non-circular geometric profile, as shown in FIGS. 4, 7, 9a and 9b, among others, which show the gasket according to the present invention sectionised by a transverse vertical plane.

With particular reference to FIG. 7, the section with vertical plane A-A, indicated in FIG. 8, highlights the profile of the gasket 10 according to the present invention. On the transverse plane, the profile of the inner surface 10a is not flat, but conical, with conicity facing toward the inside of the toroid.

Similarly, on the transverse plane, the profile of the outer surface 10b is not flat, but conical, with conicity facing toward the outside of the toroid.

Preferably, and with reference to the embodiment shown by way of a non-exclusive example in the accompanying drawings, the inner surface 10a has a substantially triangular profile comprising two sides 10a, inclined with respect to the vertical, that converge in a connecting portion 10a" that has a substantially flat, horizontal surface, connected to the two sides 10a' by means of a fillet radius, on a transverse diametral plane. Preferably, the gasket profile is symmetrical with respect to a vertical diametral axis B.

The outer surface 10b has a circumferential seat 12 adapted to contain an O-Ring 13. Preferably, the outer surface 10b also does not have a fiat profile on a transverse vertical plane A-A, but a conical profile. The conical profile is centrally interrupted by the presence of the groove 12.

Preferably, said outer surface 10b has a triangular profile comprising two sides 10b', inclined with respect to the vertical, and that converge in said seat 12 of said O-Ring 13, on a transverse diametral plane.

The gasket 1 according to the present invention, therefore preferably comprises an O-Ring 13 that makes the gasket more elastic and responsive to a change in operating conditions.

In addition, the gasket 1 according to the present invention comprises at least one slot or flaring 11 having the function of discharging the fluid at at least one side surface 10c, 10d. The addition of the slots 11 on the support flanks 10c, 10d of the gasket 1 allows the side thrusts created by the oil pressure to be balanced. The situation is the one shown in FIG. 5, where the arrows indicate the side forces exerted by the fluid pressure.

With reference to FIG. 8, said slots 11 preferably have a radial development on the side surfaces 10c and 10d.

The slots 11 are in this case arranged at 90° along the profile of the gasket, as can be seen in FIG. 8 in particular.

The gasket 1 according to the present has overall size and dimensions suitable for allowing the insertion thereof into the same seat in which the O-Ring of the type known in the prior art is housed, thereby allowing the new gasket to be used without having to modify the coupler design.

The presence of the O-Ring 13 is one of the elements that most contribute to making the composite gasket 1, object of the present invention, innovative.

Indeed, among other advantages, the O-Ring 13 makes the gasket more elastic and flexible, so that it can more responsively follow the profiles of the valve body 120 of the male coupler and of the valve body 320 of the female coupler and/or of the inner slider 310 of the female coupler during their relative sliding (in the connecting & disconnecting steps) thus guaranteeing fluid-tightness.

Figure 5:
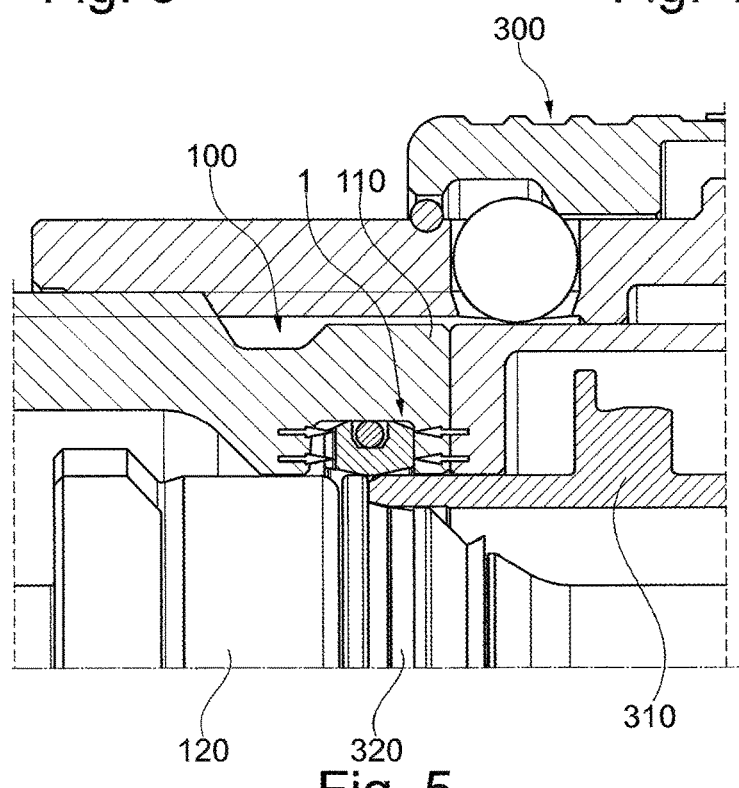
FIG. 5 shows a cross section of the same critical step of FIG. 2 in the case in which the coupler comprises a gasket according to the present invention.
Figure 6:
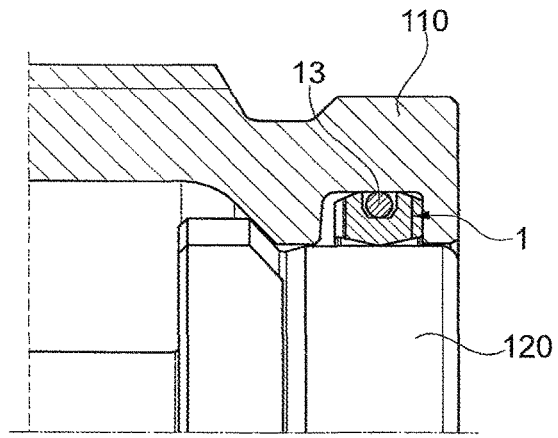
FIG. 6 shows a cross section of a detail of a gasket according to the present invention housed in its own seat in a male coupler.

The situation is outlined in FIG. 5, where the gasket 1, and the inner surface 10*a* of the body 10 of the gasket in particular, is in contact with the outer surface of the valve body 320 of the female coupler 300 and with the inner slider 310, again of the female coupler 300, during the coupler connecting step.

In all operating conditions and in the connecting and disconnecting steps, the gasket 1 according to the present invention is therefore always free of the crushing and extrusion phenomenon, under both low and high pressure.

From the point of view of mechanical behaviour, the composite gasket 1, the object of the present invention has a high tenacity and abrasion and wear resistance.

These characteristics are in particular guaranteed by the material that the gasket is made of, as mentioned, preferably polyurethane, which comes into contact with the valves 120, 320, and with the inner slider 310 of the couplers during the connecting and disconnecting steps, in that due to their function, the couplers are coupled and decoupled many times with repeated pressure and flow cycles.

With reference to FIGS. 7, 8 and 9*a*, we will now illustrate the function of the relief grooves 11 obtained On the sides 10*c*, 10*d* of the body 10 of the gasket 1.

The presence of one or more relief grooves 11 allows the tendency of the gasket to rotate and become stuck between the moving valves during the connecting and disconnecting step of the coupler and on the varying influence of the pressure of the fluid creating leakage of the fluid and damage to the gasket itself, to be prevented.

The presence of the relief grooves 11 allows the couplers to be connected and disconnected even in the presence of residual pressure within the couplers, within the male coupler in particular, as in the critical step in which the gasket comes into contact with the moving valves, it is hydraulically balanced.

It has thus been shown that each technical expedient for the gasket object of the present invention contributes to achieving a specific technical result.

The simultaneous presence of all the herein-described innovative characteristics allows the gasket to resolve a large number of problems that afflict the current solutions of a type known in the prior art, in the operation of the quick couplers, Each characteristic could also, in itself, entail technical advantages and therefore the gasket according to the present invention is defined in its essential characteristics by the main independent claim attached hereto, the dependent claims introducing additional characteristics that complement the invention allowing a multiplicity of technical advantages to be achieved.

The gasket for quick couplers according to the present invention thus allows the drawbacks that have been left unresolved by the prior art to be overcome.

In addition, a quick coupler that comprises this invention is also an object of the present invention.

The invention claimed is:

1. A gasket for quick couplers, comprising:
   a main, annular body that comprises an inner surface facing in an inward direction at an inner diameter, an outer surface facing in an outward direction at an outer diameter, a first side surface having a flat profile and extending between said inner surface and said outer surface, and a second side surface having a flat profile and extending between said inner surface and said outer surface;
   said inner surface having a conical profile with conicity facing in the inward direction; and
   said outer surface having a conical profile with conicity facing in the outward direction and comprising a circumferential seat in which an O-Ring is housed, said outer surface consisting of:
      first and second flat surface portions extending from said first side surface and said second side surface, respectively, each inclined with respect to the outward direction, that converge in said seat of said O-ring;
      third and fourth surface portions extending from said first and second flat surface portions, respectively, parallel to said first and second side surfaces;
      fifth and sixth inclined flat surface portions extending from said third and fourth surface portions, respectively; and
      a seventh flat surface portion perpendicular to said third and fourth surface portions and joining said fifth and sixth surface portions;
      wherein said third to seventh surface portions define said circumferential seat.

2. Gasket according to claim 1, wherein said inner surface consists of two sides, inclined with respect to the inward direction, and a connecting portion that has a substantially flat surface connecting the two sides by means of a fillet radius.

3. Gasket according to claim 1, wherein at least one slot is obtained on said first and second side surfaces.

4. Gasket according to claim 2, wherein at least one slot is obtained on said first and second side surfaces.

5. Gasket according to claim 3, wherein said at least one slot extends radially along said first and second side surfaces.

6. Gasket according to claim 4, wherein said at least one slot extends radially along said first and second side surfaces.

7. Gasket according to claim 5, comprising a first plurality of said at least one slot, placed on said first side surface spaced 90° from each other.

8. Gasket according to claim 6, comprising a first plurality of said at least one slot, placed on said first side surface spaced 90° from each other.

9. Quick coupler comprising a front valve gasket according to claim 1.

10. Gasket according to claim 7, comprising a second plurality of said at least one slot, placed on said second side surface spaced 90° from each other at an offset with respect to the first plurality of said at least one slot.

11. Gasket according to claim 10, wherein the second plurality of said at least one slot is placed on said second side surface at an offset of 45° with respect to the first plurality of said at least one slot.

12. Gasket according to claim 8, comprising a second plurality of said at least one slot, placed on said second side surface spaced 90° from each other at an offset with respect to the first plurality of said at least one slot.

13. Gasket according to claim 12, wherein the second plurality of said at least one slot is placed on said second side surface at an offset of 45° with respect to the first plurality of said at least one slot.

14. Gasket according to claim 1, wherein said O-Ring is toroidal.

15. A male quick coupler comprising:
a hollow cylindrical outer body;
a valve body that slides longitudinally with respect to the outer body; and
the gasket of claim 1, disposed between the outer body and the valve body to ensure fluid tightness between the outer body and the valve body and between the outer body and an inner slider of a female quick coupler as the valve body slides longitudinally with respect to the outer body to transfer the gasket from the valve body to the inner slider of the female quick coupler, said inner surface of said gasket coming into contact with the valve body of the male quick coupler and coming into contact with the inner slide of the female quick coupler as the valve body slides longitudinally with respect to the outer body to transfer the gasket from the valve body to the inner slider of the female quick coupler.

* * * * *